(12) United States Patent
Suzuki

(10) Patent No.: US 11,416,187 B2
(45) Date of Patent: Aug. 16, 2022

(54) INFORMATION PROCESSING SYSTEM, INFORMATION PROCESSING APPARATUS, AND NON-TRANSITORY COMPUTER READABLE MEDIUM

(71) Applicant: FUJIFILM BUSINESS INNOVATION CORP., Tokyo (JP)

(72) Inventor: Noriaki Suzuki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/060,154

(22) Filed: Oct. 1, 2020

(65) Prior Publication Data
US 2021/0303220 A1    Sep. 30, 2021

(30) Foreign Application Priority Data

Mar. 25, 2020    (JP) .............................. JP2020-053506

(51) Int. Cl.
*G06K 15/00*    (2006.01)
*G06F 3/12*    (2006.01)
*G06N 20/00*    (2019.01)
*G06F 3/06*    (2006.01)

(52) U.S. Cl.
CPC ............ *G06F 3/122* (2013.01); *G06F 3/0604* (2013.01); *G06F 3/0631* (2013.01); *G06F 3/0674* (2013.01); *G06F 3/1229* (2013.01); *G06N 20/00* (2019.01)

(58) Field of Classification Search
CPC ...... G06F 3/122; G06F 3/0604; G06F 3/0631; G06F 3/0674; G06F 3/1229; G06N 20/00
See application file for complete search history.

(56) References Cited

U.S. PATENT DOCUMENTS

| 8,526,021 B2 | 9/2013 | Takahashi | |
| 2017/0070898 A1* | 3/2017 | Anderson | ............. H04W 24/04 |
| 2018/0098233 A1* | 4/2018 | Talari | ....................... H04W 4/14 |

FOREIGN PATENT DOCUMENTS

JP    2010-219792 A    9/2010

* cited by examiner

*Primary Examiner* — Moustapha Diaby
(74) *Attorney, Agent, or Firm* — Oliff PLC

(57) ABSTRACT

An information processing system includes a first and a second information processing apparatus including a memory and one or more processors. In the first information processing apparatus, the processor is configured to acquire information on utilization of a resource utilized in the operation and cause the memory to store information, and with a condition satisfied with the information on the utilization of the resource, output to second information processing apparatus the information on the utilization of the resource from memory. In the second information processing apparatus, the processor is configured to cause the memory to store information on the utilization of the resource output from first information processing apparatus and select a solution responsive to the information on the utilization of the resource stored on the memory via artificial intelligence that has learned through machine learning to select the solution responsive to the information on the utilization of the resource.

8 Claims, 17 Drawing Sheets

FIG. 10

| DATE | MEMORY UTILIZATION STATUS | CPU UTILIZATION STATUS | DISK IO STATUS | ... |
|---|---|---|---|---|
| | | | | |

1005 — DATE
1010 — MEMORY UTILIZATION STATUS
1015 — CPU UTILIZATION STATUS
1020 — DISK IO STATUS
1000

FIG. 11

| LOG TABLE ID (1105) | SOLUTION (1110) |
|---|---|
|  |  |

| LOG TABLE ID (1205) | CAUSE (1210) | SOLUTION (1215) |
|---|---|---|
|  |  |  |

1200

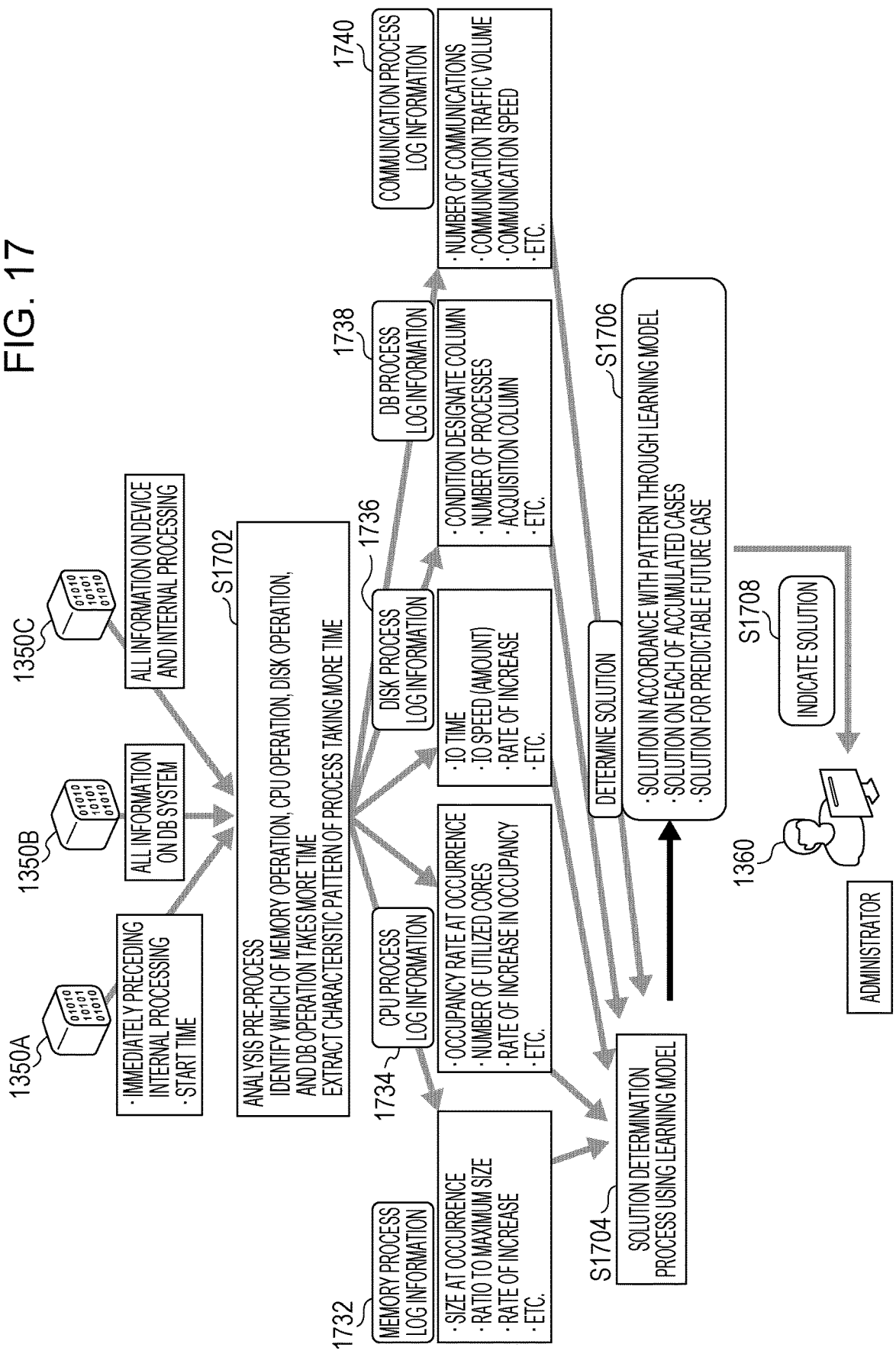

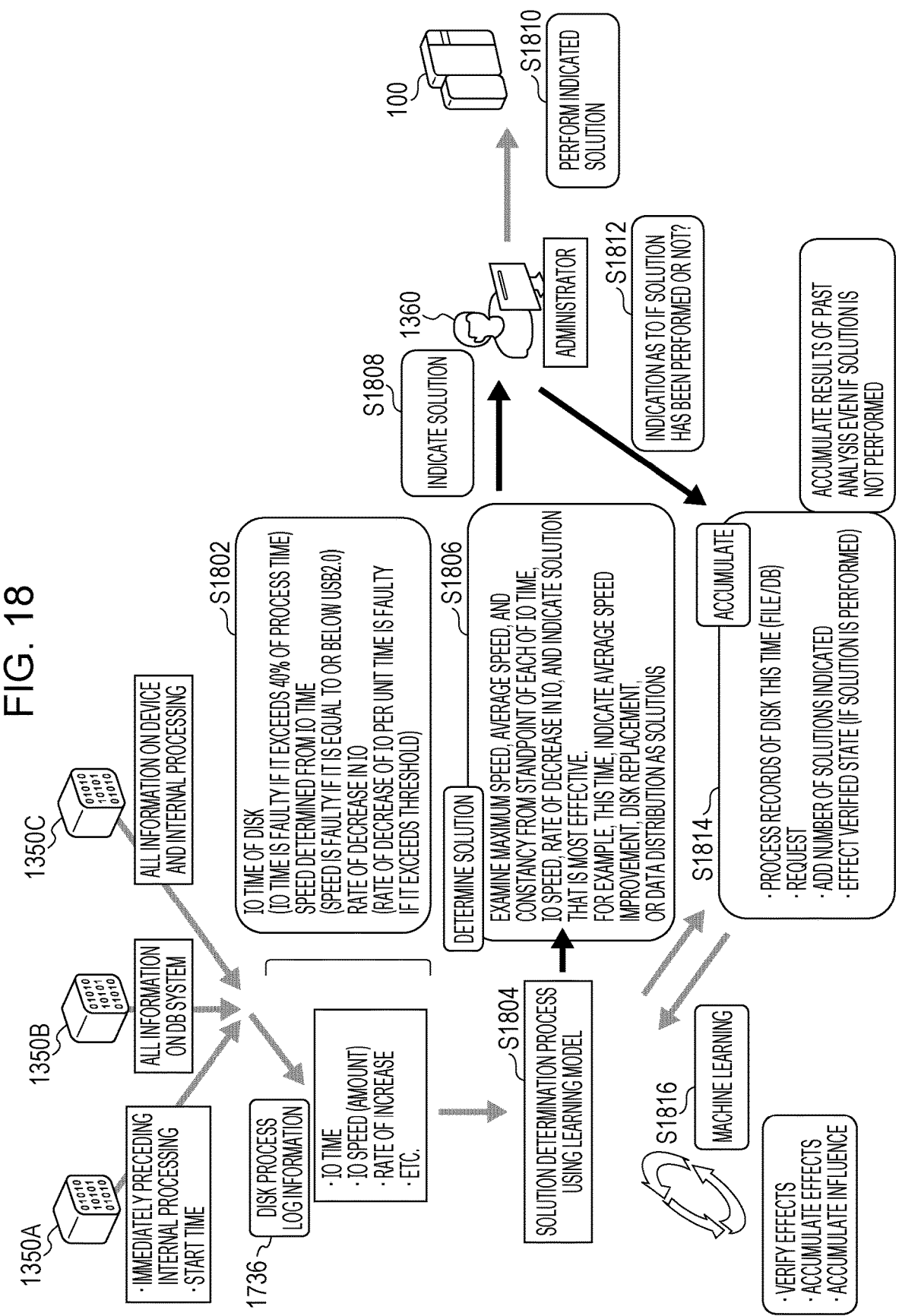

FIG. 19

| 1905 RESOURCE | 1910 FEATURES | 1915 SOLUTION | 1920 FURTHER SOLUTION | 1900 |
|---|---|---|---|---|
| MEMORY INFORMATION | SHARP INCREASE | EXPAND MEMORY | INDICATE SIZE OF EXPANSION | |
| | CONTINUATION NEAR LIMIT | EXPAND MEMORY | INDICATE SIZE OF EXPANSION | |
| CPU INFORMATION | CONTINUED USE AT HIGH UTILIZATION RATE | INCREASE NUMBERS OF CPU'S AND CORES | INDICATE NUMBERS OF CPU'S AND CORES WHEREVER DESIRED | |
| | LIMITED HIGH UTILIZATION RATE | DISTRIBUTE PROCESS | INDICATE WHICH PROCESS TO BE REVIEWED | |
| | SQL CONDITION COLUMN | REINFORCE INDEX | INDICATE UP TO WHAT COMBINATION TO BE REINFORCED | |
| DB INFORMATION | MEMORY UTILIZATION | EXPAND BUFFER | INDICATE SIZE OF EXPANSION | |
| | FILE IO SPEED | EXPAND DISK | INDICATE DESIRED SPEED LEVEL | |
| | FILE IO COMPETITION | STORE ON SEPARATE DISKS | INDICATE FILES THAT ARE TO BE STORED ON SEPARATE DISKS | |
| INTERNAL PROCESSING | SPECIFIC PROCESS SLOW | REPORT TO DEVELOPER | | |
| | Out Of Memory | INCREASE MEMORY SIZE OF VM | INDICATE SIZE OF EXPANSION | |

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-053506 filed Mar. 25, 2020.

BACKGROUND

(i) Technical Field

The present disclosure relates to an information processing system, an information processing apparatus, and a non-transitory computer readable medium.

(ii) Related Art

Japanese Unexamined Patent Application Publication No. 2010-219792 discloses a multi-function apparatus. By operating a browser on an operation panel of the multi-function apparatus, a user accesses a web server, views or prints a folder or a document on the web server. Such a multi-function apparatus is intended to provide to the user a user interface (UI) that easily responds to an error if it occurs in a process flow. In response to a process request from the multi-function apparatus, the UI determines whether the process request is made after the occurrence of the error. If the process request is made after the occurrence of the error, the UI determines the malfunctioning multi-function apparatus and the cause for the error. In response to the cause for the error, the malfunctioning multi-function apparatus defines a process flow in accordance with the process request after the occurrence of the error. The UI transmits to the multi-function apparatus UI information used to instruct the execution of the defined process. In response to the UI information and instruction information from the user, the multi-function apparatus performs the process responsive to the process request after the occurrence of the error through the process defined by flow definition information.

SUMMARY

Aspects of non-limiting embodiments of the present disclosure relate to providing an information processing system, an information processing apparatus, and a non-transitory computer readable medium for appropriately selecting, when a fault occurs in an information processing apparatus and a solution for fixing the fault is selected, the solution using not only information prior to the occurrence of the fault but also investigation data after the occurrence of the fault in comparison with the case in which only the investigation data after the occurrence of the fault is collected.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes a first information processing apparatus including a memory and one or more processors and a second information processing apparatus including a memory and one or more processors. In the first information processing apparatus, the processor is configured to, in response to a start of an operation, acquire information on utilization of a resource utilized in the operation and cause the memory to store the information, and with a condition satisfied with the information on the utilization of the resource, output to the second information processing apparatus the information on the utilization of the resource from the memory. In the second information processing apparatus, the processor is configured to cause the memory to store the information on the utilization of the resource output from the first information processing apparatus and select a solution responsive to the information on the utilization of the resource stored on the memory via artificial intelligence that has learned through machine learning to select the solution responsive to the information on the utilization of the resource.

BRIEF DESCRIPTION OF THE DRAWINGS

Exemplary embodiments of the present disclosure will be described in detail based on the following figures, wherein:

FIG. 10 illustrates a data structure of a utilization status log table;

FIG. 11 illustrates a data structure of a learning table;

FIG. 12 illustrates a data structure of a learning table;

FIG. 17 illustrates a process example of the first exemplary embodiment;

FIG. 18 illustrates a process example of the first exemplary embodiment;

FIG. 19 illustrates a data structure of a resource-based solution table; and

DETAILED DESCRIPTION

Exemplary embodiments of the disclosure are described with reference to the drawings.

First Exemplary Embodiment

Figure 1:
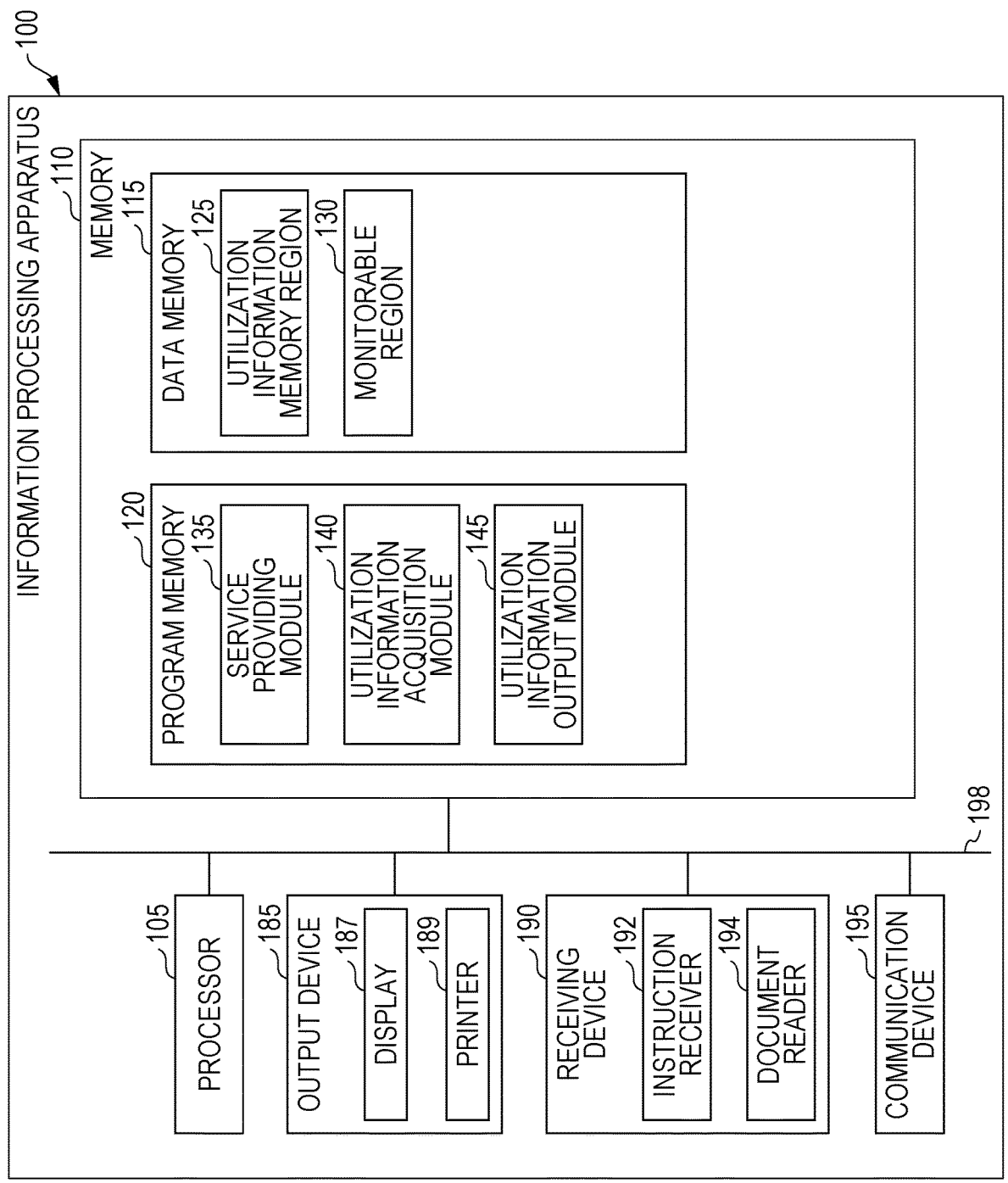
FIG. 1 illustrates a conceptual modular configuration of a first exemplary embodiment.

FIG. 1 illustrates a conceptual modular configuration of the exemplary embodiment (an information processing apparatus 100).

The term "module" refers to a software component (including a computer program) that is logically separable, or a hardware component. The module of the exemplary embodiment refers to not only a module in a computer program but also a module in a hardware configuration. The discussion of the exemplary embodiments also serves as the discussion of a system, method, and computer programs for causing the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to mean that a determination as to whether something is A is performed and that if something is determined as A, an action B is to be taken. The statement becomes meaningless if the determination as to whether something is A is not performed. If a discussion is made of events "A, B, and C," the discussion is applicable to at least one of the events "A, B, and C" unless otherwise noted. For example, the discussion is applicable to the case in which only the event A is selected.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the first exemplary embodiment has a function of performing a process (operation), for example, providing a service. If a fault occurs in the process, the information processing apparatus 100 collects information prior to the occurrence of the fault when investigation data is collected. Referring to FIG. 1, the information processing apparatus 100 includes at least a processor 105 and memory 110 and further includes a bus 198 through which data is exchanged therebetween. The information processing apparatus 100 may further include an output device 185, receiving device 190, and communication device 195. Data is exchanged via the bus 198 among the processor 105, memory 110, output device 185, receiving device 190, and communication device 195.

The block diagram in FIG. 1 also illustrates a hardware configuration of a computer that implements the first exemplary embodiment. The computer hardware executing a program of the first exemplary embodiment is a computer illustrated in FIG. 1 and is typically a computer, such as a personal computer or server. Specifically, the information processing apparatus 100 employs the processor 105 and the memory 110 as a storage device.

One or more processors 105 may be employed. The processor 105 may include a central processing unit (CPU) or a microprocessor. If multiple processors 105 are employed, they may be a tightly or loosely coupled multiprocessor. For example, a single processor 105 may include multiple processor cores. Alternatively, a system including multiple computers linked via a communication network and functioning like a virtual single computer may be employed. The system may be a loosely coupled multiprocessor that is constructed as a cluster system or a computer cluster. The processor 105 executes a program on the program memory 120.

The memory 110 may include a semiconductor memory, such as a register or a cache memory in the processor 105 or a memory, such as a random-access memory (RAM) or a read-only memory (ROM). The memory 110 may also be an internal memory device, such a hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, memory card or other external storage device or other auxiliary memory device.

The memory 110 may also be a memory device of a server connected to the information processing apparatus 100 via a communication network.

The memory 110 includes a data memory 115 storing data, in particular, and a program memory 120 storing programs, in particular. The program memory 120 and the data memory 115 may store programs of the modules illustrated in FIG. 1, programs such as an operating system to start up the computer, and data, such as parameters that appropriately vary in the execution of the modules.

The output device 185 includes a display 187 and printer 189. The display 187 may be a liquid-crystal display, organic electroluminescent (EL) display, or three-dimensional display and displays, in text or image, process results from the processor 105 and data on the data memory 115. The printer 189 may be a printer or a multi-function device and prints the process results from the processor 105 and data on the data memory 115. The output device 185 may also include a speaker and actuator to vibrate the device.

The receiving device 190 includes an instruction receiver 192 and document reader 194. The instruction receiver 192, such as a keyboard, mouse, microphone, camera (including eye-gaze detection camera) or other device, receives data responsive to user operation performed on these devices.

A touch screen serving as both the display 187 and the receiving device 190 may be used. In such a case, without the physical presence of keys, the keyboard function may be implemented by drawing a keyboard (called a software keyboard or a screen keyboard) on the touch screen using software.

In particular, the display 187 and the instruction receiver 192 are used as a user interface.

The document reader 194, such as a scanner or a camera, receives image data generated in response to reading or photographing a document.

The communication device 195 is a communication network interface used to connect to another apparatus via a communication network.

The exemplary embodiments related to a computer program is implemented when the computer program as software is read onto the program memory 120 as a hardware resource and the software and hardware cooperate with each other.

The hardware configuration in FIG. 1 is illustrated for exemplary purposes only. The exemplary embodiments are not limited to the configuration illustrated in FIG. 1 and is acceptable as long as the configuration implements the modules of the exemplary embodiment. For example, the processor 105 may include a graphics processing unit (GPU) (including general-purpose computing on graphics processing unit (GPGPU)). Part of the modules may be implemented by a dedicated hardware resource (such as application specific integrated circuit (ASIC)) or field-programmable gate array (FPGA) that is reconfigurable integrated circuit. The part of the modules may be in an external system that is connected to the information processing apparatus 100 via a communication network. Multiple of the system in FIG. 1 may be operatively coupled via a communication network. The system in FIG. 1 may be incorporated in a personal computer, portable information communication apparatus (such as cellular phone, smart phone, mobile device, or wearable computer), information appliance, robot, copier, fax, scanner, printer, or multi-function apparatus (an image processing apparatus having at least two of scanner function, printer function, copier function, and fax function).

The processor 105 is connected to the memory 110, output device 185, receiving device 190, and communication device 195 via the bus 198. The processor 105 executes a process in accordance with the computer program that describes an execution sequence of each module and stored on the program memory 120. For example, in response to user operation received by the instruction receiver 192, the processor 105 performs the process of a module responsive to the user operation, causes the data memory 115 to store the process results, outputs the process results to the display 187, or transmits the process results to another apparatus by controlling the communication device 195.

The memory 110 includes the data memory 115 and program memory 120 and is connected to the processor 105, output device 185, receiving device 190, and communication device 195 via the bus 198.

The data memory 115 includes a utilization information memory region 125 and monitorable region 130. The utilization information memory region 125 and the monitorable region 130 may be located in the same memory device or in different memory devices. For example, the utilization information memory region 125 may be a random-access memory (RAM) and the monitorable region 130 may be a hard disk. If the RAM has a larger memory capacity, both the utilization information memory region 125 and the monitorable region 130 may be located in the RAM.

The utilization information memory region 125 stores information on the utilization of a resource acquired by the utilization information acquisition module 140. For example, the information on the utilization of the resource may be log information. In the following discussion, the log information may be used as the information on the utilization of the resource. The log information may include a value that is a measurement of the status of the resource or a value that is calculated by applying the measurement on an equation. The value that is the measurement of the status of the resource may be an amount of used memory. The value calculated in accordance with the equation may be a rate of increase per unit time in the amount of used memory.

If the information on the utilization of the resource satisfies a condition, the utilization information output module 145 outputs to the monitorable region 130 the information on the utilization of the resource stored on the utilization information memory region 125. The monitorable region 130 thus stores the information on the utilization of the resource stored on the utilization information memory region 125. This is applicable when the information on the utilization of the resource satisfies the condition. The monitorable region 130 may also be accessed by an information processing apparatus 200. The outputting of the information to the monitorable region 130 that is accessible by the information processing apparatus 200 is interpreted as the outputting of the information to the information processing apparatus 200. It is noted that the condition is determined beforehand on each piece of information on a per resource basis. For example, the condition is satisfied if the value of the information exceeds or drops a threshold.

The program memory 120 stores a service providing module 135, utilization information acquisition module 140, and utilization information output module 145.

The service providing module 135 performs a service providing process. When this process is performed, a fault may possibly occur. The fault may be a drop in performance, a halt of the process, a malfunction of a component as a resource, etc.

When the service providing module 135 starts a process, the utilization information acquisition module 140 acquires the information on the utilization of the resource utilized in the process and causes the utilization information memory region 125 to store the information. Regardless of whether or not a fault occurs, the utilization information acquisition module 140 acquires the information on the utilization of the resource utilized in the process once the service providing module 135 starts the process.

The information on the utilization of the resource includes at least one piece of information selected from the group of the utilization status of the memories, the utilization status of the processors, the input and output (IO) status of a disk, the operational status of structured query language (SQL), the memory status of a database, the file IO status of the database, a special event record of the database, and a communication status. SQL is a query language used to query about an operation of data and making a definition in a relational database management system (RDBMS). The operational status of SQL corresponds to the information on the utilization of the resource.

If the information on the utilization of the resource satisfies the condition, the utilization information output module 145 outputs to the information processing apparatus 200 the information on the utilization of the resource from the utilization information memory region 125. The outputting of the information may be transmission via a communication network or may be performed by enabling the information processing apparatus 200 to access the information.

For example, the utilization information output module 145 output the information on the utilization information memory region 125 to the monitorable region 130 as a file including occurrence time information (for example, accurate to milliseconds). Even when the process by the service providing module 135 is in the middle thereof, the utilization information output module 145 may start outputting the information and then successively add the information on the process performed by the service providing module 135 as more information arises.

If the service providing module 135 has completed the process with the condition not satisfied with the information on the utilization of the resource, the utilization information output module 145 may delete the information on the utilization of the resource stored on the utilization information memory region 125. In this case, the information on the utilization of the resource is not output to the information processing apparatus 200. Specifically, the utilization information output module 145 neither transfers the information from the utilization information memory region 125 to the monitorable region 130 nor transfers the information from the utilization information memory region 125 to the information processing apparatus 200.

Even when the process performed by the service providing module 135 is interrupted, the utilization information output module 145 may acquires the information on the utilization of the resource utilized in the process from the start thereof to the interruption thereof and causes the utilization information memory region 125 to store the information.

The interruption of the process may be triggered when the process is quit by the user. The user may possibly interrupt the process because performance of the process drops.

The process of the service providing module 135 may be interrupted in this way, but the utilization information output module 145 outputs to the information processing apparatus 200 the information on the utilization of the resource on the utilization information memory region 125 until the interruption.

If the process performed by the service providing module 135 is interrupted before the condition is satisfied, the utilization information output module 145 may modify the condition. The modification of the condition includes modifying the threshold.

If the process is interrupted by the user, the interruption is likely due to a slow speed. In such a case, the condition is modified such that the outputting is performed prior to the interruption.

When the condition is modified, the utilization information output module 145 may modify the condition in accordance with a statistical value at a timing of the past interruption of the process.

Since the interruption is performed at a timing different from user to user, the statistical value is used. The statistical value may be the mean value, the most frequent value, or the median value of past values.

Figure 2:
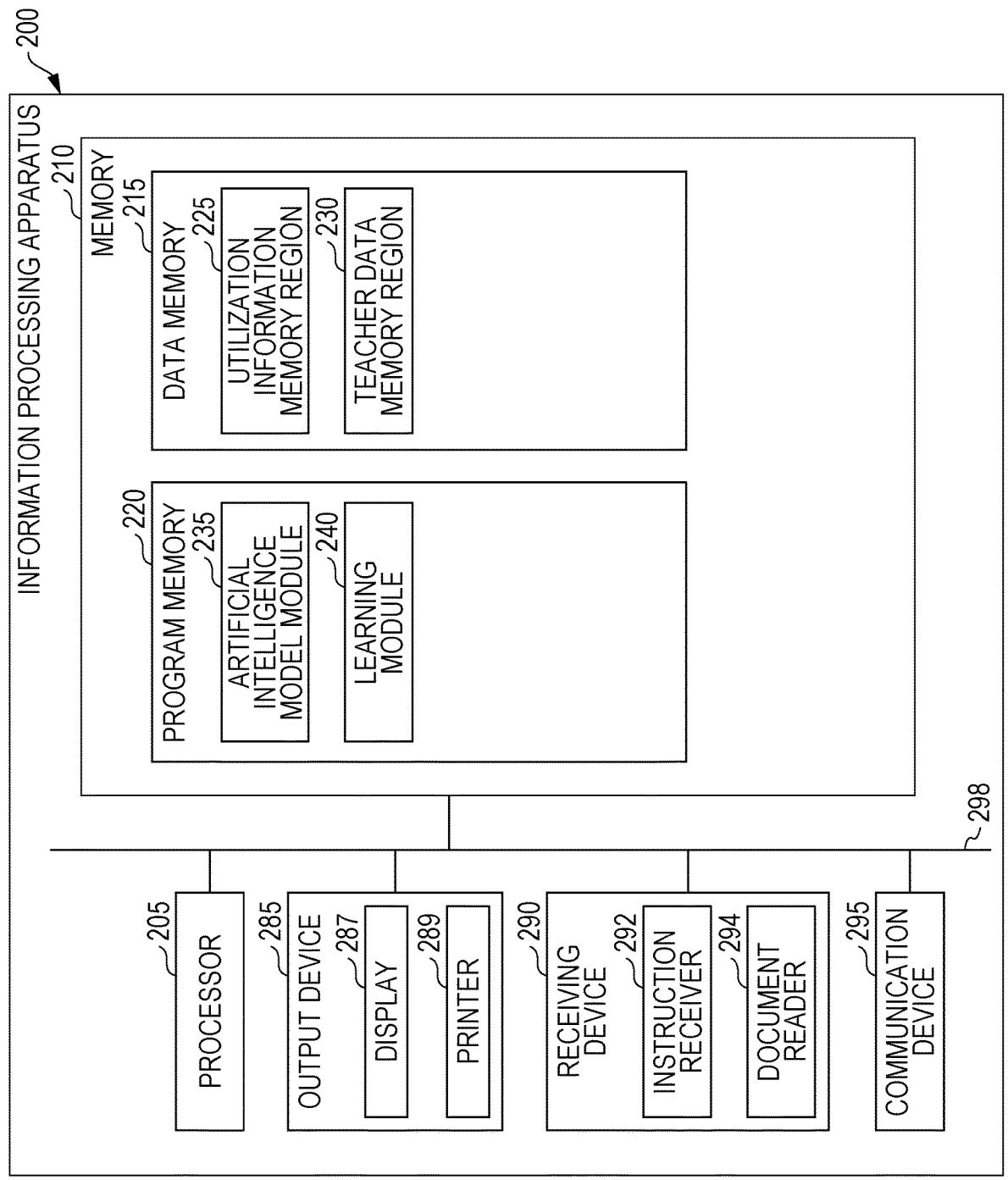
FIG. 2 illustrates a conceptual modular configuration of the first exemplary embodiment.

FIG. 2 illustrates a conceptual modular configuration of the first exemplary embodiment (an information processing apparatus 200). The information processing apparatus 200 is communicable with the information processing apparatus 100 via a communication network.

The information processing apparatus 200 includes a processor 205, memory 210, output device 285, receiving device 290, and communication device 295.

The information processing apparatus 200 has the same configuration as the information processing apparatus 100 in FIG. 1. The contents of the memory 210 is different from those of the memory 110. The contents of the memory 210 are described, in particular. The other configuration (such as the output device 285) are identical to the configuration of the corresponding modules in the information processing apparatus 100 and the discussion thereof is omitted herein.

The memory 210 includes a data memory 215 and program memory 220 and is connected to the processor 205, output device 285, receiving device 290, and communication device 295 via a bus 298.

The data memory 215 includes a utilization information memory region 225 and teacher data memory region 230.

The utilization information memory region 225 stores the information on the utilization of the resource output from the information processing apparatus 100. For example, the communication device 295 may communicate with the information processing apparatus 100, receive the information on the utilization of the resource stored on the utilization information memory region 125, and cause the utilization information memory region 225 to store the information. The communication device 295 may communicate with the information processing apparatus 100, access the information on the utilization of the resource stored on the monitorable region 130, and cause the utilization information memory region 225 to store the information.

The teacher data memory region 230 stores teacher data that the learning module 240 uses to create an artificial intelligence model module 235. The teacher data may be a combination of information on the past utilization of the resource and a solution at that time or may be a combination of the information on the past utilization of the resource and a cause and solution at that time.

The solutions include at least one of operations selected from the group of operations of expanding the memories, changing the disks, re-locating the disks, modifying the configuration of the disks, increasing the number of the processors, adding or deleting the index of the database, modifying the memory size of the database, and modifying the communication network.

The program memory 220 stores an artificial intelligence model module 235 and learning module 240.

The artificial intelligence model module 235 has learned to select a solution responsive to the information on the utilization of the resource through machine learning of the learning module 240.

The artificial intelligence model module 235 selects the solution responsive to the information on the utilization of the resource stored on the utilization information memory region 225. The artificial intelligence model module 235 may indicate the selected solution to a person in charge. If the solution is modifying a parameter, the artificial intelligence model module 235 may transmit the solution to the information processing apparatus 100 and the information processing apparatus 100 may perform the solution.

If SQL takes time, the artificial intelligence model module 235 analyzes the feature of SQL and then indicates to the person in charge an operation that is urgent and executable, such as setting an index, expanding the memory, or canceling sorting.

If the artificial intelligence model module 235 has learned to select what resource is a cause, the artificial intelligence model module 235 may select the resource for the cause as well as the solution.

The artificial intelligence model module 235 performs control to display the solution on a display. For example, if a person in charge is to perform the solution, such as expanding the memory, the solution is displayed on the display of a terminal used by the person in charge. As previously described, if the information processing apparatus 100 is enabled to perform the solution, information on the solution is transmitted to the information processing apparatus 100 without displaying on the display. Whether the person in charge is to perform the solution or whether the information processing apparatus 100 is enabled to perform the solution is determined based on a flag attached beforehand to each solution. This determination is made based on the flag. The person in charge may be the developer of the service providing module 135 or the administrator of the information processing apparatus 100.

The solution may be reported to an engineer using an email. The reporting destination may be changed in accordance with the amount of money for the solution. For example, if the amount of money is equal to or above a predetermined value, the reporting destination may be a manager in charge.

The learning module 240 creates through machine learning the artificial intelligence model module 235 that has utilized teacher data in the teacher data memory region 230. Machine learning is a technique of automatically learning a model that classifies unknown data out of a set of data into several categories that are defined in advance. Machine learning method may be decision trees, Naive Bayes models, decision lists, support vector machines, maximum entropy methods, conditional random fields, convolutional neural networks, or recurrent neural networks.

Machine learning may be performed in accordance with the teacher data on the artificial intelligence model module 235 that is a combination of the information on the past utilization of the resource and the solution at the time of the utilization. In such a case, the artificial intelligence model module 235 is created that has learned to select the solution responsive to the information on the utilization of the resource.

Machine learning may be performed in accordance with the teacher data on the artificial intelligence model module 235 that is a combination of the information on the past utilization of the resource and the cause and solution at the time of the utilization. In such a case, the artificial intelligence model module 235 is created that has learned to select the cause and solution responsive to the information on the utilization of the resource.

Figure 3:
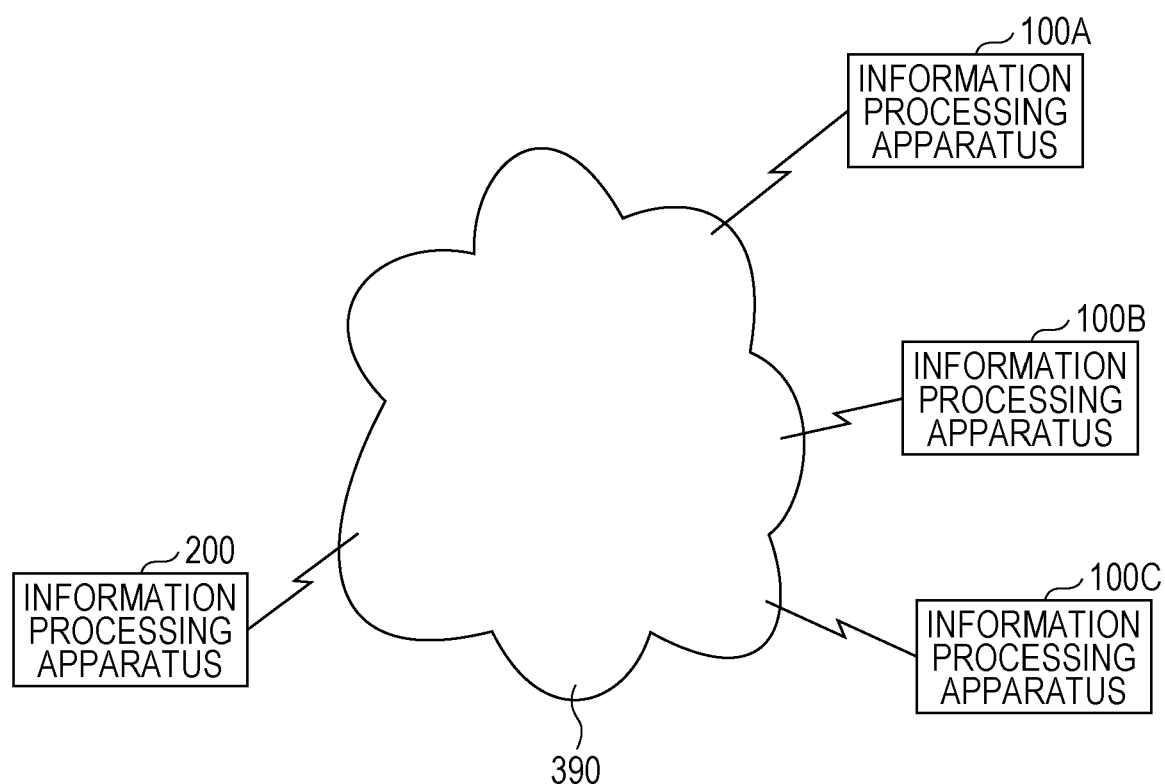
FIG. 3 illustrates a system configuration of the first exemplary embodiment.

FIG. 3 illustrates a system configuration of the first exemplary embodiment.

An information processing apparatus 100A, information processing apparatus 100B, information processing apparatus 100C, and information processing apparatus 200 are interconnected to each other via a communication network 390. The communication network 390 may be a wired network, a wireless network, or a combination thereof.

The functions of the information processing apparatus 100 and information processing apparatus 200 may be implemented using a cloud service.

The information processing apparatus 100 may provide a service in an on-premises environment or in a cloud environment. If a fault occurs on the information processing apparatus 100, the information processing apparatus 200 selects a solution to fix the fault. As previously described, the fault may a drop in performance.

Figure 4:
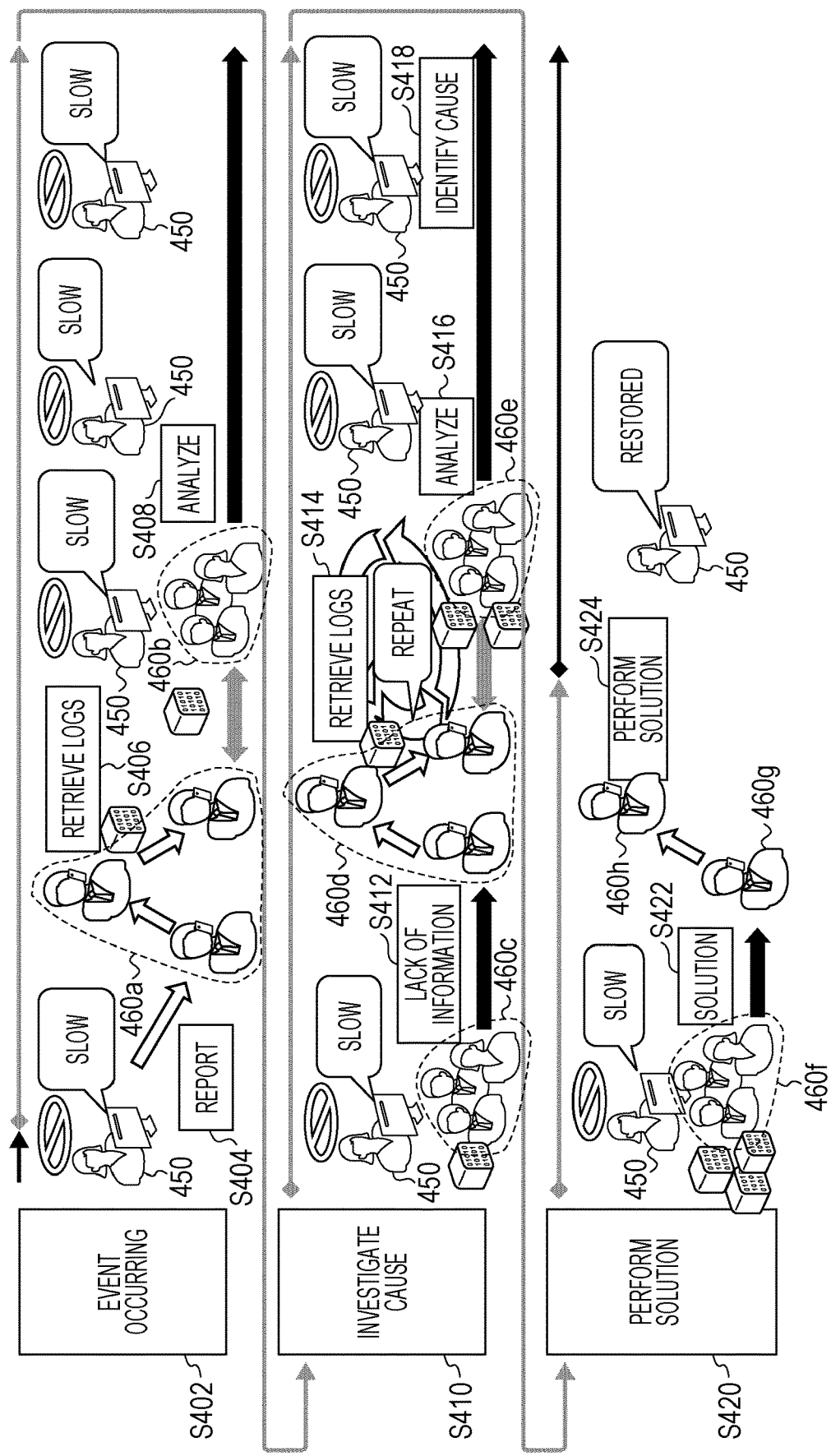
FIG. 4 illustrates a process flow of identifying a fault and performing a solution without using the first exemplary embodiment when the fault occurs in an information processing apparatus.

FIG. 4 illustrates a process flow of identifying a fault and performing a solution without using the first exemplary embodiment when the fault occurs in an information processing apparatus that provides service. An administrator 460 may be a group of persons.

In step S402, a user 450 uses the information processing apparatus. An event, such as a drop in performance, may occur during the use.

In step S404, the user 450 reports the event to an administrator 460a. The report may include a complaint.

In step S406, the administrator 460a collects log information on a process in a target information processing apparatus. The log information is a kind of the information on the utilization of a resource.

In step S408, an administrator 460b analyzes the log information.

In step S410, the administrator 460b investigates a cause for the event.

In step S412, an administrator 460c determines that the log information is insufficient.

In step S414, an administrator 460d further collects log information.

In step S416, an administrator 460e analyzes the log information.

In step S418, the administrator 460e identifies the cause.

In step S420, an administrator 460f determines solutions for the target information processing apparatus.

In step S422, an administrator 460g conveys the solution to an administrator 460h.

In step S424, the administrator 460h performs the solution on the target information processing apparatus. The user 450 may thus enjoy the service as usual from the information processing apparatus. Until the fault is fixed, namely, during the time period from the occurrence of the event to when the fault is fixed, the drop in performance remains and the user 450 is forced to be waiting.

If an event, such as a drop in performance, occurs on an information processing apparatus, the collection of the log information for investigation, the analysis of the log information, the identifying of the cause, and the selection of a solution may be delayed, thus inconveniencing the user 450. The log information is collected after the occurrence of the event. This means that the status prior to the occurrence of the event is not recognized. To reproduce the fault, further log information is to be used. The event may sometimes have no repeatability. The analysis of only the log information after the event is insufficient to select the cause and solution.

The problem of the drop in performance is discussed further in detail.

In the existing system and environment, information collected at the problem of the drop in performance is typically limited. Referring to FIG. 4, the user 450 operates the information processing apparatus and may detect slowness several times in the process of the information processing apparatus. The user 450 reports the event to the administrator 460 as a supplier. The event is then reproduced, the log information to be used is acquired and analyzed. This process is repeated to identify the cause. Until the cause is identified, the event is repeatedly reproduced and the log information is repeatedly analyzed. The user 450 has no choice but to continuously operate the information processing apparatus while feeling stressed by the slowness.

If a process time exceeds a threshold in an existing mechanism, recording is performed. When a fault occurs in the mechanism, no information for fixing the fault is recorded and lack of information is typically common. Since records are output after the process is complete in most of systems, no information is output even when an operation step in the process exceeds a threshold. Information that is to be used for investigation is typically insufficient.

Providing a memory region for recording in a cloud environment leads to a rise in a usage fee. Recording all the log information is not typical practice. However, lack of information related to a performance problem gives rise to the following inconvenience:

The user 450 continues to work remaining under stress from a slow speed; and

The administrator 460 serving as a system provider suffers from higher costs since identifying the cause is difficult without reproducing the event and collecting the log information.

After a process starts, the information processing apparatus 100 as the first exemplary embodiment acquires the information on the utilization of the resource utilized in the process and causes the utilization information memory region 125 to store the information. If the information on the utilization of the resource exceeds a threshold, the information processing apparatus 100 outputs the information on the utilization of the resource from the utilization information memory region 125 to the information processing apparatus 200. The information processing apparatus 200 selects a solution responsive to the information on the utilization of the resource through artificial intelligence. If the target process is complete with the information on the utilization of the resource not exceeding the threshold, the information processing apparatus 100 deletes the information on the utilization of the resource from the utilization information memory region 125 to avoid using extra memory.

Figure 5:
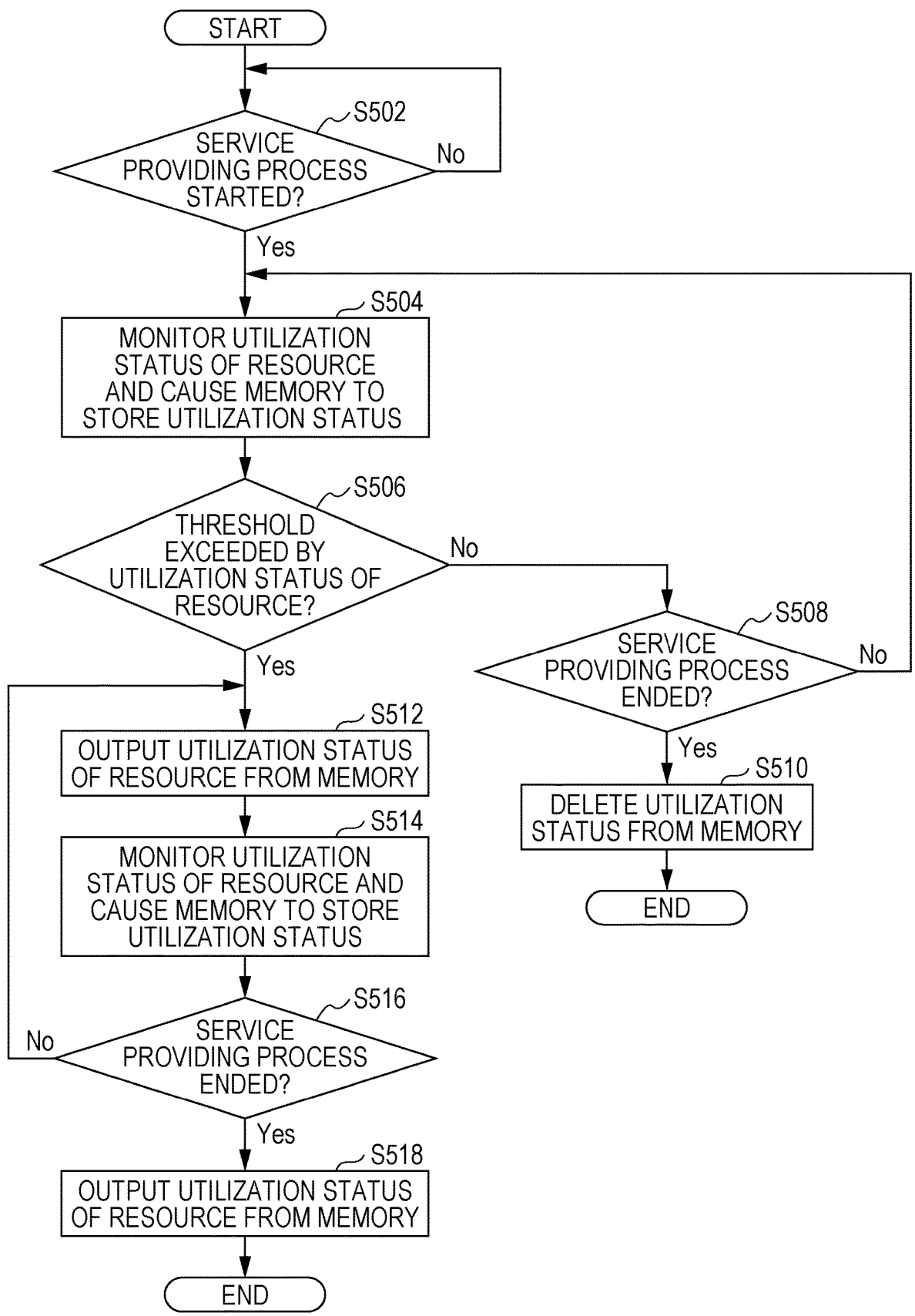
FIG. 5 is a flowchart illustrating a process example of the first exemplary embodiment.

FIG. 5 is a flowchart illustrating a process example of the first exemplary embodiment (the information processing apparatus 100).

In step S502, the utilization information acquisition module 140 determines whether the service providing module 135 has started a service providing process. If the service providing process has started, the utilization information acquisition module 140 proceeds to step S504; otherwise, the utilization information acquisition module 140 waits on standby until the service providing process starts. In step S504 and subsequent steps, the service providing module 135 performs the service providing process in parallel.

In step S504, the utilization information acquisition module 140 monitors the utilization status of the resource (an example of the information on the utilization of the resource) and causes the utilization information memory region 125 in the data memory 115 to store the utilization status. For example, a utilization status log table 1000 is stored. FIG. 10 illustrates the utilization status log table 1000. The utilization status log table 1000 includes a date column 1005, memory utilization status column 1010, CPU utilization status column 1015, and disk input and output (IO) status column 1020. The date column 1005 stores a date of acquisition (year, month, day, hours, minutes, seconds, subseconds, and/or a combination thereof). The memory utilization status column 1010 stores the utilization status of the memory on that date. For example, the utilization status is an amount of memory in use. The CPU utilization status column 1015 stores the utilization status of a CPU on that date. For example, the utilization status is a CPU usage rate on the date. The disk IO status column 1020 stores a disk input and output (IO) status on the date. For example, the disk IO status means the number of uses of a disk, a usage amount of the disk, and/or the speed of the disk.

In step S506, the utilization information acquisition module 140 determines whether the utilization status of the resource exceeds a threshold (an example of a condition). If the utilization status of the resource exceeds the threshold, the utilization information acquisition module 140 proceeds to step S512; otherwise, the utilization information acquisition module 140 proceeds to step S508. The threshold is predetermined on a per utilization basis of the resource. For example, the threshold may be defined as a usage rate of the CPU of 90% or X seconds throughout which the usage rate of the CPU remains exceeded 90%. If the process is interrupted in response to user operation, one of utilization statuses of the utilization of the resource closest to the threshold at the interruption is extracted and the threshold is then modified to the closest value. For example, the value of the utilization status of the resource at the interruption or a value smaller than that value may be set to be a threshold. Specifically, the threshold is modified such that the threshold is exceeded at the interruption or at a timing prior to the interruption. If multiple interruptions are made, the mean value, the most frequent value, or the median value of those values (if accurately described, the values of the utilization statuses of the resource at the interruptions or the values smaller than those values) may be set to be a threshold.

In step S508, the utilization information acquisition module 140 determines whether the service providing module 135 has completed the service providing process. If the service providing process has been completed, the utilization information acquisition module 140 proceeds to step S510; otherwise, the utilization information acquisition module 140 returns to step S504.

In step S510, the utilization information output module 145 deletes the utilization status of the resource stored on the utilization information memory region 125 and ends the process. In this case, the service providing process has normally ended without modifying the threshold in the utilization status of the resource.

In step S512, the utilization information output module 145 outputs the utilization status of the resource on the utilization information memory region 125 to the information processing apparatus 200.

In step S514, the utilization information acquisition module 140 monitors the utilization status of the resource and causes the utilization information memory region 125 in the data memory 115 to store the utilization status of the resource.

In step S516, the utilization information acquisition module 140 determines whether the service providing module 135 has completed the service providing process. If the service providing process has been completed, the utilization information acquisition module 140 proceeds to step S518; otherwise, the utilization information acquisition module 140 returns to step S512.

In step S518, the utilization information output module 145 outputs to the information processing apparatus 200 the utilization status of the resource on the utilization information memory region 125 and ends the process. In this case, the process is ended with the utilization status of the resource exceeding the threshold (including the case in which a fault is detected during the service providing process).

If the process is interrupted in response to user operation in operations in step S504 and thereafter, the utilization information acquisition module 140 acquires the information on the utilization of the resource utilized in the process from the start thereof to the interruption thereof and causes the utilization information memory region 125 to store the information. The utilization information acquisition module 140 performs this operation regardless of whether or not the utilization status of the resource exceeds the threshold (namely, regardless of whether the answer to step S506 is yes or no). Even with the utilization status of the resource not exceeding the threshold, the utilization information output module 145 outputs, after the interruption, the utilization status of the resource from the utilization information memory region 125 to the information processing apparatus 200. If the utilization status of the resource exceeds the threshold, the utilization information output module 145 outputs the utilization status of the resource from the utilization information memory region 125 to the information processing apparatus 200 in step S512. Through these operations, even when the utilization status of the resource does not exceed the threshold, the information processing apparatus 200 may analyze the utilization status of the resource and select the solution.

Figure 6:
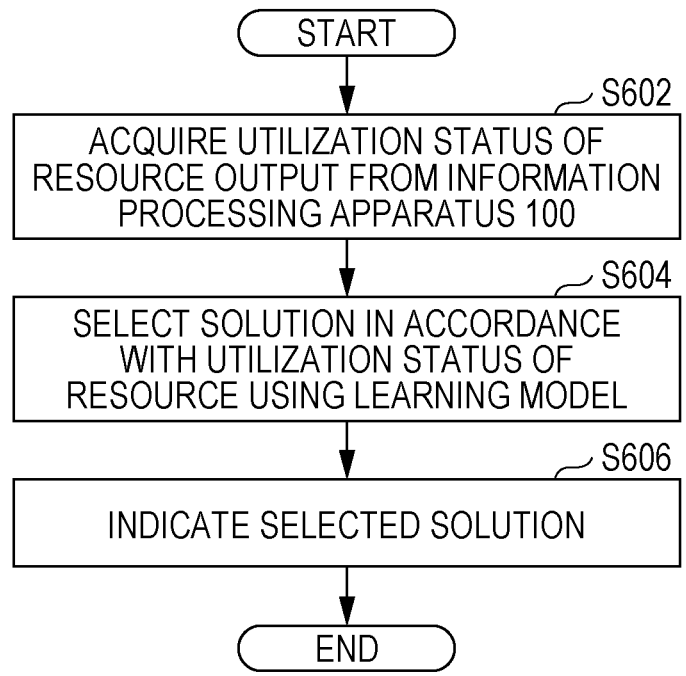
FIG. 6 is a flowchart illustrating a process example of the first exemplary embodiment.

FIG. 6 is a flowchart illustrating a process example of the first exemplary embodiment (the information processing apparatus 200).

In step S602, the utilization status of the resource output from the information processing apparatus 100 is acquired.

In step S604, the solution is selected in view of the utilization status of the resource using a learning model.

In step S606, the selected model is indicated.

Figure 7:
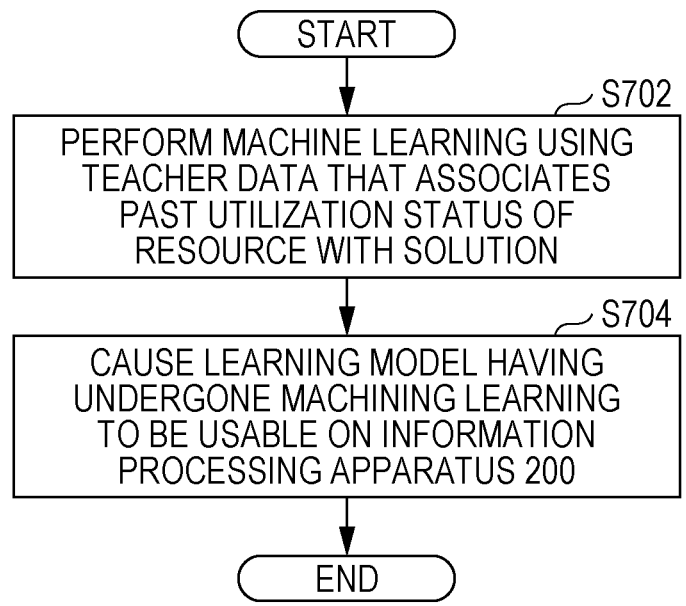
FIG. 7 is a flowchart illustrating a process example of the exemplary embodiment.

FIG. 7 is a flowchart illustrating a process example of the first exemplary embodiment (the information processing apparatus 200). Through the process, the learning model to indicate the solution is created.

In step S702, the teacher data that associates the information on the past utilization of the resource with the solution is used to perform machine learning. For example, machine learning is performed using a learning table 1100. FIG. 11 illustrates a data structure of the learning table 1100. The learning table 1100 includes a log table ID column 1105 and solution column 1110. In the first exemplary embodiment, the log table ID column 1105 stores information (specifically, a log table identification (ID)) uniquely identifying the utilization status log table 1000. The solution column 1110 stores the solution when the log information is acquired. Specifically, the learning table 1100 stores a set of the information on the utilization of the resource and solution performed in the past.

In step S704, the learning model having undergone machine learning is set to be usable on the information processing apparatus 200.

Figure 8:
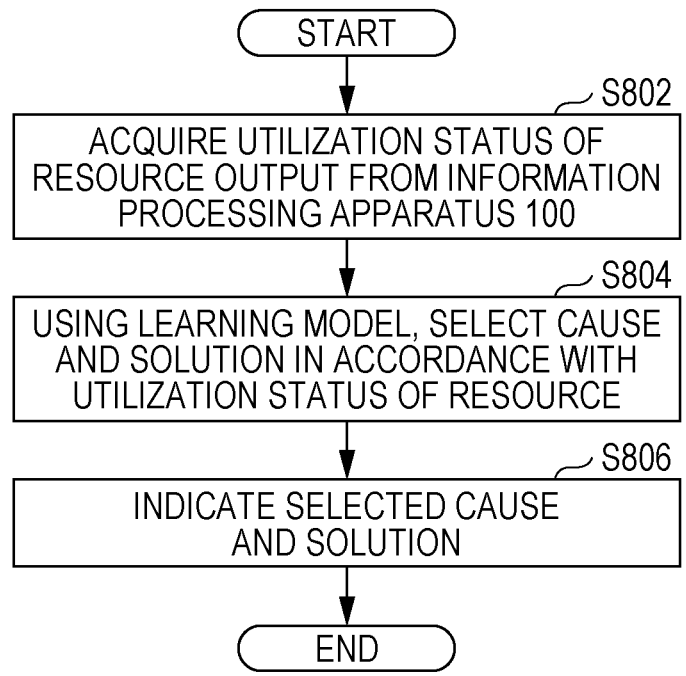
FIG. 8 is a flowchart illustrating a process example of the first exemplary embodiment.

FIG. 8 is a flowchart illustrating a process example of the first exemplary embodiment (the information processing apparatus 200). In the process, the cause and solution are indicated.

In step S802, the utilization status of the resource output from the information processing apparatus 100 is acquired.

In step S804, the cause and solution are selected in view of the utilization status of the resource using the learning model.

In step S806, the selected cause and solution are indicated.

Figure 9:
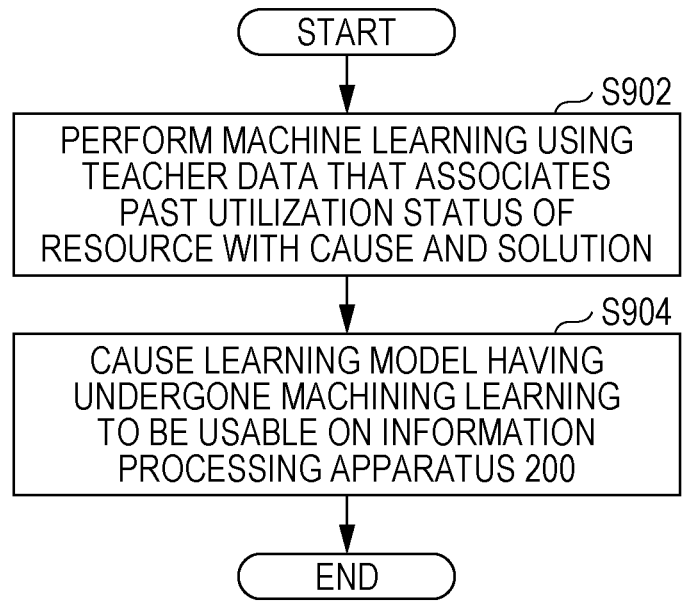
FIG. 9 is a flowchart illustrating a process example of the first exemplary embodiment.

FIG. 9 is a flowchart illustrating a process example of the first exemplary embodiment (the information processing apparatus 200). In the process, the learning model to indicate the cause and solution is created.

In step S902, the machine learning is performed using the teacher data that associates the past utilization status of the resource with the cause and solution. For example, the machine learning is performed using a learning table 1200. FIG. 12 illustrates a data structure of the learning table 1200. The learning table 1200 includes a log table ID column 1205, cause column 1210, and solution column 1215. The log table ID column 1205 stores the ID of the utilization status log table 1000. The cause column 1210 stores the cause when the log information is acquired. The solution column 1215 stores the solution when the log information is acquired. Specifically, the learning table 1200 stores a set of the information on the past utilization of the resource and the cause and solution performed in the past.

In step S904, the learning model having undergone machine learning is set to be usable on the information processing apparatus 200.

Figure 13:
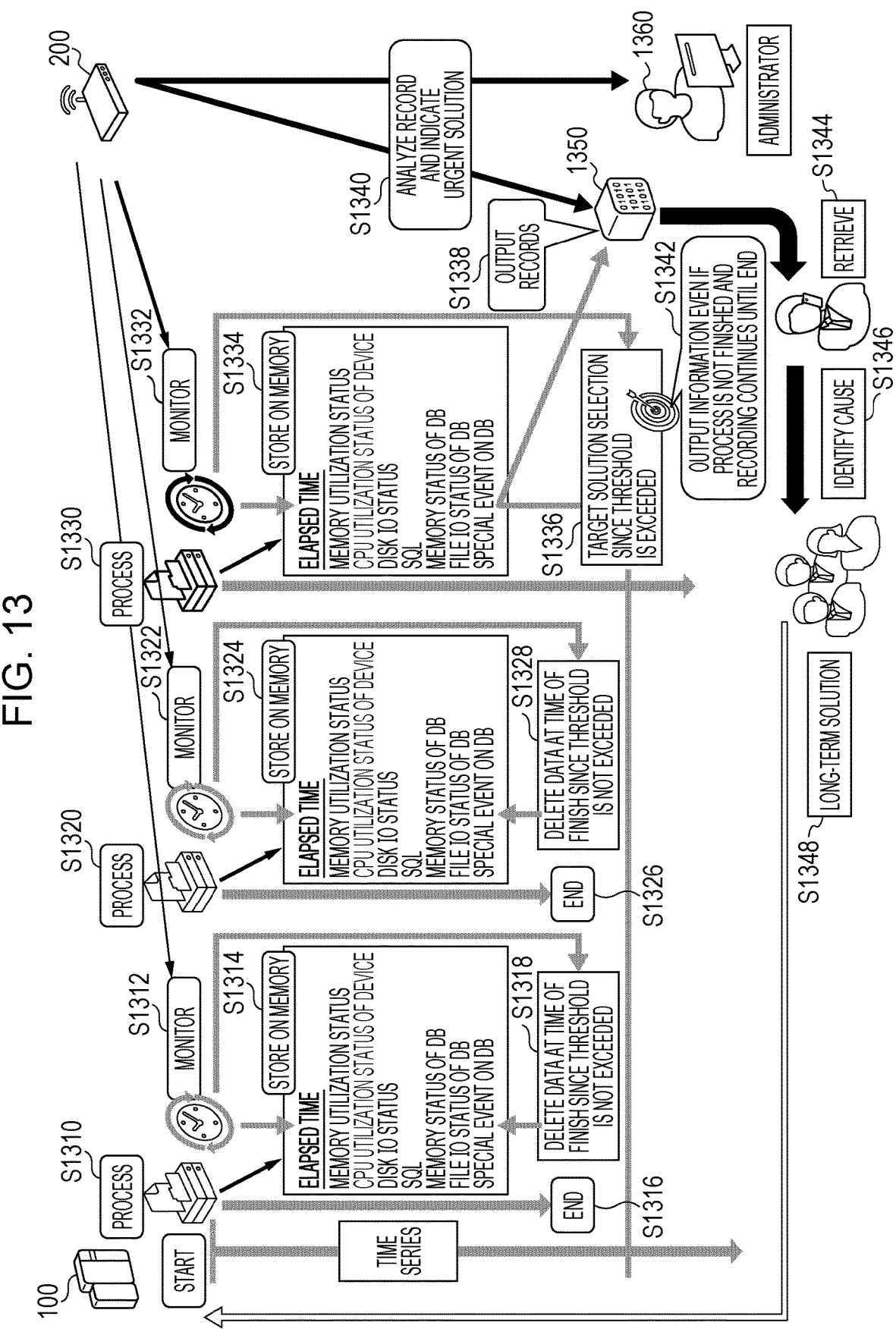
FIG. 13 illustrates a process example of the first exemplary embodiment.

FIG. 13 illustrates a process example of the first exemplary embodiment. Three service providing processes (1) through (3) are illustrated in FIG. 13. The service providing processes (1) and (2) are performed when the processes have ended with no threshold exceeded and the service providing process (3) is performed with the threshold exceeded. The service providing processes (1) and (2) are performed only by the information processing apparatus 100 and the service providing process (3) is performed by the information processing apparatus 100 and the information processing apparatus 200.

In step S1310, the service providing process (1) is started.

In step S1312, the utilization of a resource is monitored.

In step S1314, a memory utilization status with time elapse, CPU utilization of a device, disk IO status, SQL, memory status of the database (DB), file IO status of the DB, and special event on the DB are stored on the memory.

In step S1316, the process ends.

In step S1318, the information on the memory is deleted at the end of the process since the threshold is not exceeded.

In step S1320, the service providing process (2) is started.

In step S1322, the utilization of the resource is monitored.

In step S1324, a memory utilization status with time elapse, CPU utilization of the device, disk IO status, SQL, memory status of the DB, file IO status of the DB, and special event on the DB are stored on the memory.

In step S1326, the process ends.

In step S1328, the information on the memory is deleted at the end of the process since the threshold is not exceeded.

In step S1330, the service providing process (3) is started.

In step S1332, the utilization of the resource is monitored.

In step S1334, a memory utilization status with time elapse, CPU utilization of the device, disk IO status, SQL, memory status of the DB, file IO status of the DB, and special event on the DB are stored on the memory.

In step S1336, the threshold is exceeded and a solution selection is targeted.

In step S1338, the record on the memory is output to a log recording device 1350. The log recording device 1350 is an example of the monitorable region 130.

In step S1340, the information processing apparatus 200 analyzes the record on the log recording device 1350 and indicates an urgent solution to an administrator 1360.

In step S1342, the information processing apparatus 100 outputs information even when the process is not finished and continues to record until the process ends.

In step S1344, an administrator retrieves the record from the log recording device 1350.

In step S1346, the administrator identifies the cause.

In step S1348, the administrators performs a long-time solution on the information processing apparatus 100.

The operations in steps S1344 through S1348 are performed by the administrators in the above discussion. Alternatively, the operations in steps S1344 through S1348 may be performed by the learning model on the information processing apparatus 200. The identifying of the cause and the selection of the solution performed by the administrator may be adopted as the teacher data.

Figure 14:
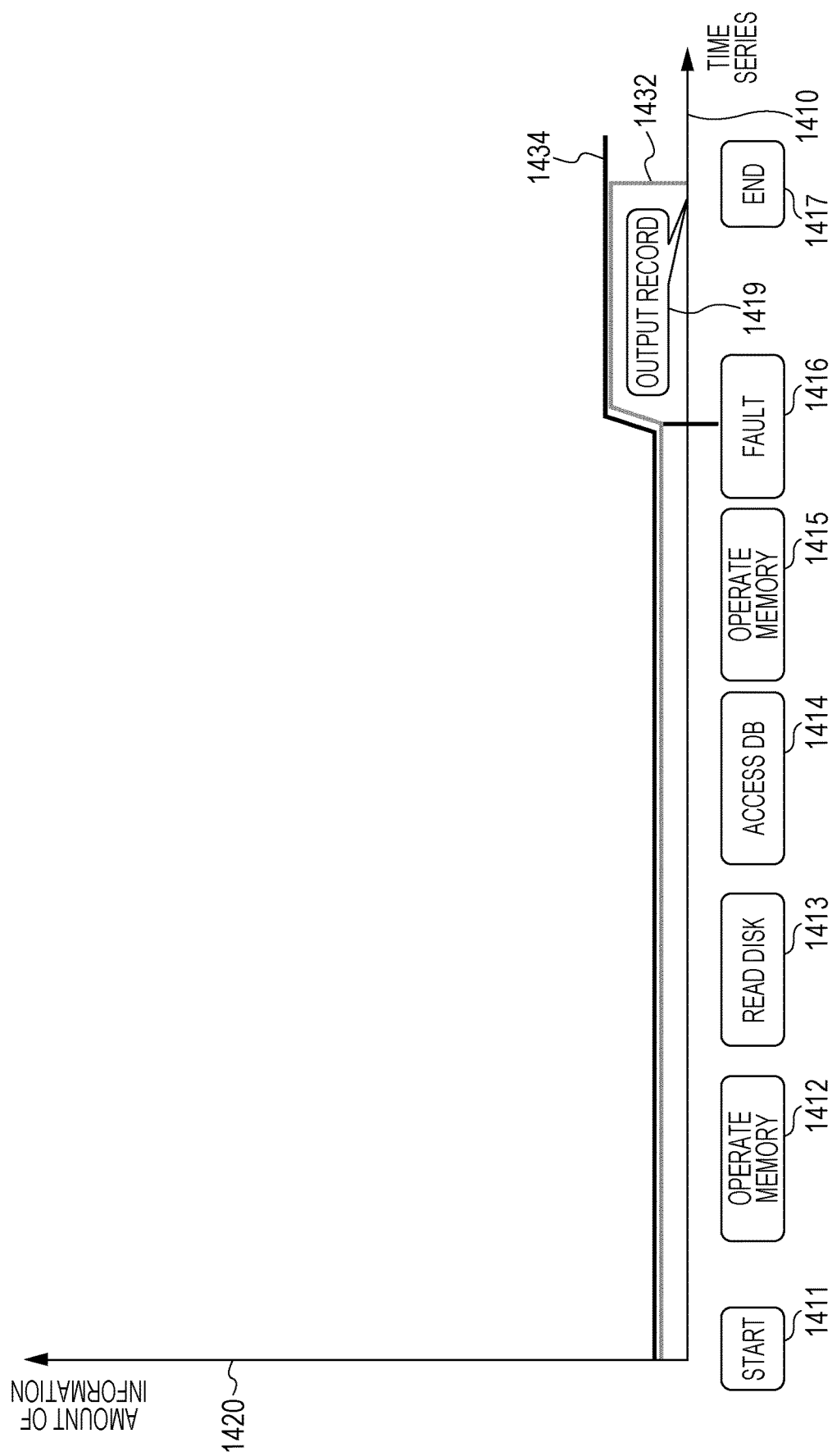
FIG. 14 is a graph illustrating the collection of information on utilization of a resource without using the first exemplary embodiment.

FIG. 14 is a graph in which the information on the utilization of the resource is collected without using the first exemplary embodiment. In this case, the log information is collected as an example of the information on the utilization of the resource after the occurrence of a fault.

The horizontal axis is a time-series axis 1410 and the vertical axis is an amount of information axis 1420. The amount of information axis 1420 indicates the size of the log information on the memory. Along the time-series axis 1410, a start operation 1411, memory operation 1412, disk reading operation 1413, DB accessing operation 1414, and memory operation 1415 are performed and a fault occurrence 1416 takes place. In graph 1432 and graph 1434, recording the log information starts from the fault occurrence 1416. Since the process is finished at an end 1417 in the graph 1432, the log information on the memory is output. Since the process is not finished at the end 1417 but continues in the graph 1434, the log information remains stored on the memory.

Only if the fault occurrence 1416 takes place in the graph 1432 and the graph 1434, the log information starts to be collected. The log information related to the memory operation 1412, disk reading operation 1413, DB accessing operation 1414, and memory operation 1415, any of which may trigger the fault occurrence 1416, is not acquired. Since the graph 1434 does not have the end 1417, the log information on the memory is neither output nor analyzed.

Figure 15:
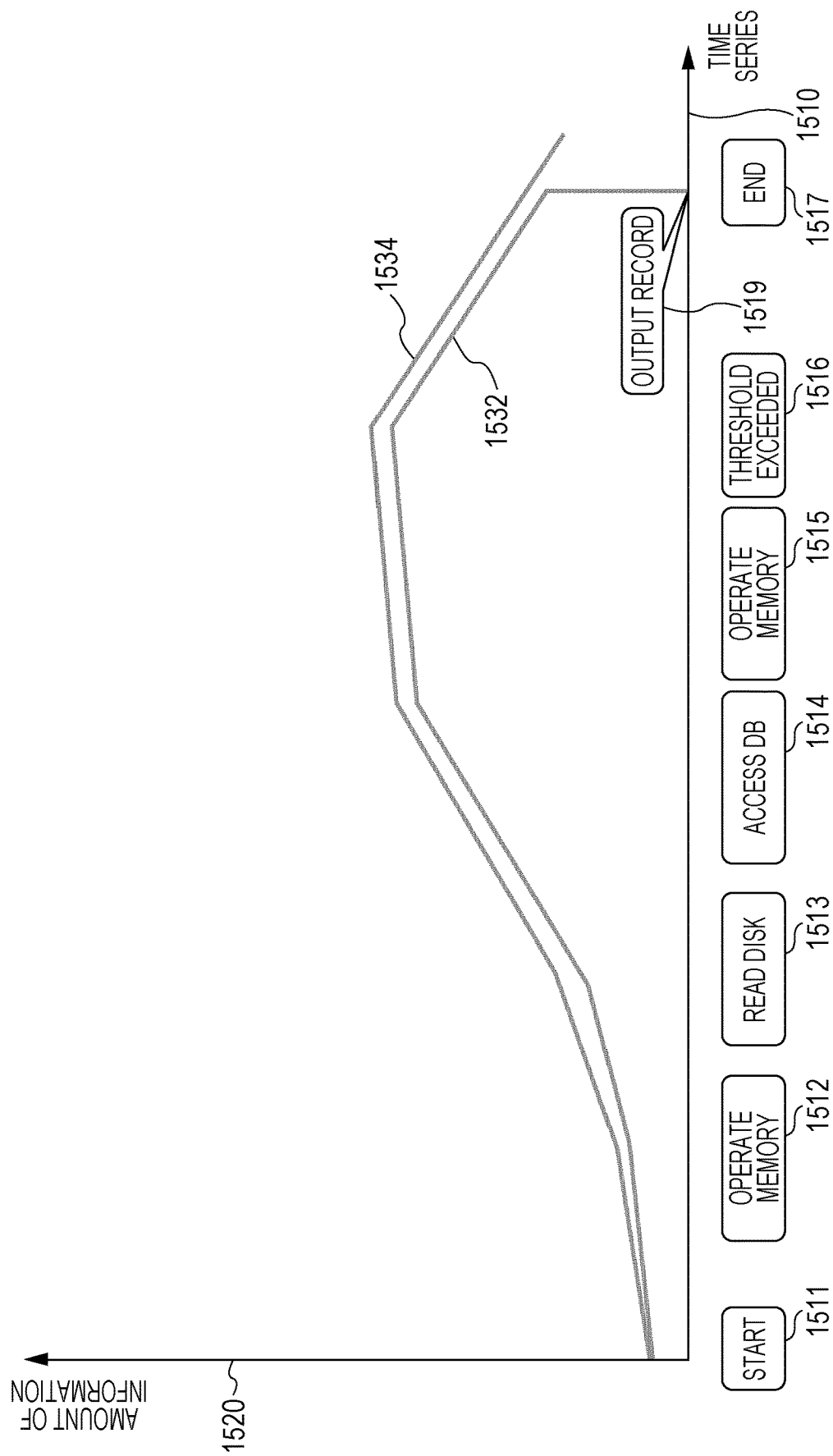
FIG. 15 is a graph illustrating the collection of the information on the utilization of the resource using the first exemplary embodiment.

FIG. 15 is a graph in which the information on the utilization of the resource is collected using the first exemplary embodiment (the information processing apparatus 100).

The horizontal axis is a time-series axis 1510 and the vertical axis is an amount of information axis 1520. The amount of information axis 1520 indicates a size of the log information on the memory. Along the time-series axis 1510, a start operation 1511, memory operation 1512, disk reading operation 1513, DB accessing operation 1514, and memory operation 1515 are performed. The graph indicates that the information on the utilization of a resource exceeds a threshold 1516. In graph 1532 and graph 1534, recording the log information starts at a start timing 1511 and outputting the log information starts at the timing when the threshold 1516 is exceeded. The size of the log information on the memory thus starts decreasing (in the graphs 1532 and 1534 in FIG. 15, the size of the log information starts decreasing at the threshold-exceeded timing 1516). Specifically, from the start timing 1511, the log information on the memory and CPU is continuously stored on the memory. If the disk reading operation 1513 is performed, the log information about it is also stored on the memory. In response to the DB accessing operation 1514, SQL process status of the database, process time, and database status are also stored on the memory. The status of the memory operation 1515, such as memory sort, is also stored on the memory.

In the graph 1532, the process is finished at an end timing 1517 and all the log information on the memory is output. In the graph 1534, the process is not finished at the end timing 1517 but continues. The log information in the process is recorded while the log information on the memory is output.

The information processing apparatus 100 of the first exemplary embodiment starts outputting the log information at the threshold-exceeded timing 1516 regardless of the end timing 1517 and then continues to collect and output the log information. As illustrated in the graph 1534, the log information continues to be output regardless of the end timing 1517 and the size of the log information on the memory decreases. Specifically, an insufficiency of memory capacity may thus be avoided.

Figure 16:
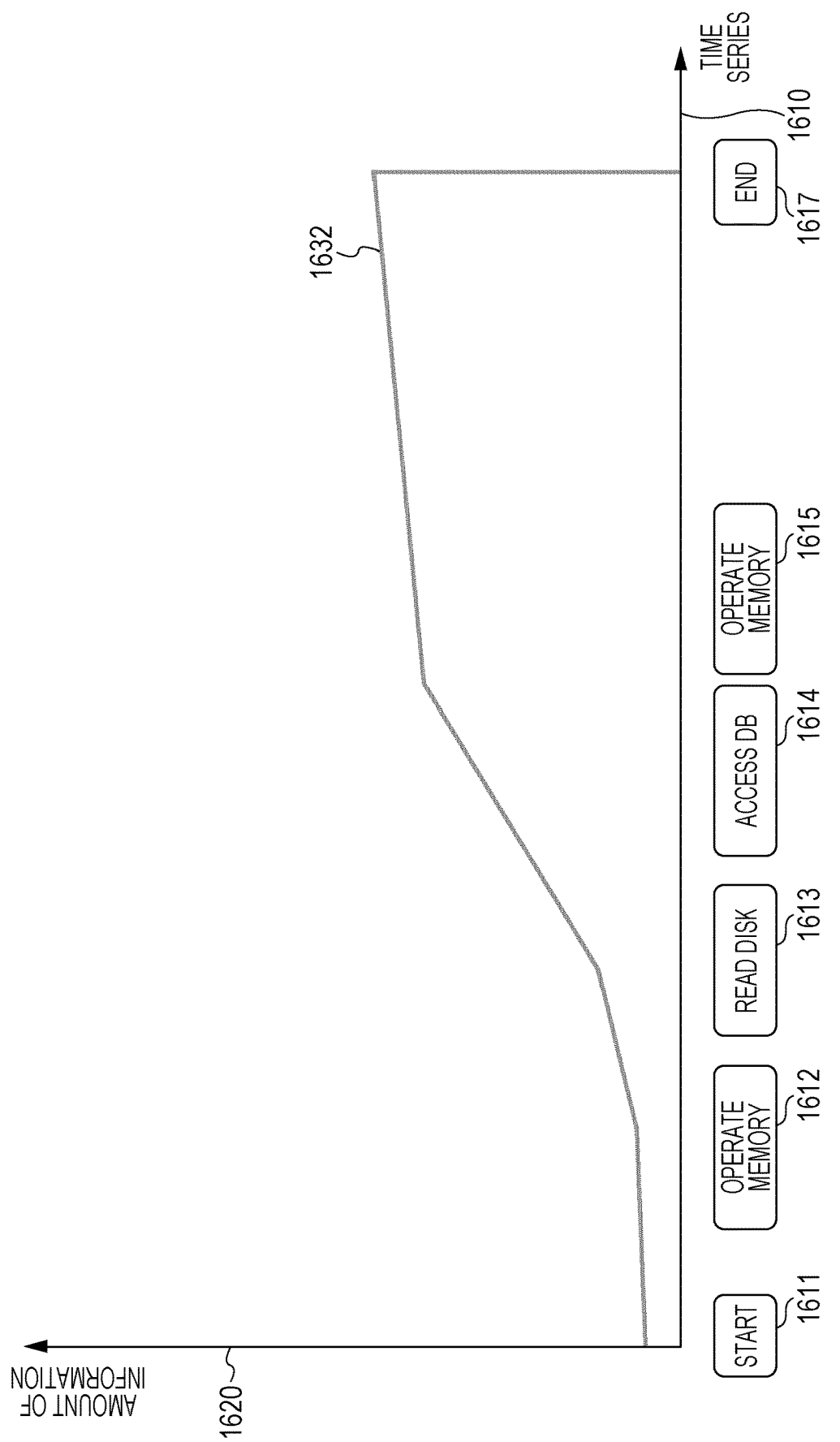
FIG. 16 is a graph illustrating the collection of the information on the utilization of the resource using the first exemplary embodiment.

FIG. 16 is a graph in which the information on the utilization of the resource is collected using the first exemplary embodiment (the information processing apparatus 100).

The horizontal axis is a time-series axis 1610 and the vertical axis is an amount of information axis 1620. The amount of information axis 1620 indicates a size of the log information on the memory. Along the time-series axis 1610, a start operation 1611, memory operation 1612, disk reading operation 1613, DB accessing operation 1614, and memory operation 1615 are performed and the process is finished at an end timing 1617. The graph indicates that the information on the utilization of a resource does not exceed a threshold. In a graph 1632, the log information starts recording the log information at the start timing 1611 and the log information on the memory is deleted at the end timing 1617.

FIG. 17 illustrates a process example of the first exemplary embodiment (the information processing apparatus 200).

The log recording devices 1350A, 1350B, and 1350C store the log information acquired by the information processing apparatus 100. Specifically, the log recording device 1350A stores information on a immediately preceding internal process and start time. The log recording device 1350B stores information on a database. The log recording device 1350C stores information on devices and information on an internal process.

In step S1702, an analysis pre-process is performed. The pre-process analyzes how long a portion of the whole process (the memory operation, CPU operation, disk operation, database operation, and communication operation) takes time and pattern-extracts features of a portion that takes the longest time.

Memory process log information 1732 includes, for example, a size at an occurrence, ratio to a maximum size, and rate of increase, and the like.

CPU process log information 1734 includes, for example, an occupancy rate at the occurrence, number of utilized cores, rate of increase in occupancy, and the like.

Disk process log information 1736 includes, for example, IO time, IO speed (or IO amount), rate of increase, and the like.

DB process log information 1738 includes, for example, a condition designate column, number of processes, acquisition column, and the like.

Communication process log information 1740 includes, for example, the number of communications, communication traffic volume, communication speed, and the like.

In step S1704, the memory process log information 1732, CPU process log information 1734, disk process log information 1736, DB process log information 1738, and communication process log information 1740 are input to perform a solution determination process using a learning model.

Specifically, in step S1706, a solution is determined in view of a pattern through the learning model. The solution may be determined on each of cases accumulated or may be determined in a predicted future case.

In step S1708, the solution is indicated to the administrator 1360. The administrator 1360 preforms the solution on the information processing apparatus 100.

FIG. 18 illustrates a process example of the first exemplary embodiment (including the information processing apparatus 200, in particular). Referring to FIG. 18, the process is not finished because the disk IO takes time. Although the process is not finished, the log information continues to be output. The information processing apparatus 200 is thus enabled to perform a solution determination process.

Based on the log information from the information processing apparatus 100, each record is checked in each of the memory operation, CPU operation, disk operation, database operation, and communication operation. In this case, the disk operation is a target.

In step S1802, the information processing apparatus 100 determines whether to output the disk process log information 1736 in accordance with one of conditions 1 through 3. In the condition 1, a disk IO time is faulty if it exceeds 40% of a process time. In the condition 2, a speed determined from the IO time is faulty if it is equal to or below the speed of USB 2.0. In the condition 3, a rate of decrease in an IO amount per unit time is faulty if it exceeds the threshold.

In step S1804, the disk process log information 1736 is input to perform the solution determination process using the learning model.

In step S1806, the solution is determined. The IO time, IO speed, and rate of IO decrease are analyzed and evaluated in terms of the maximum speed, average speed, and constancy. A solution having more effectiveness is indicated. For example, an improved average speed, disk replacement or data distribution is indicated as a solution this time.

In step S1808, the solution is indicated to the administrator 1360.

In step S1810, the administrator 1360 performs the indicated solution.

In step S1812, the information processing apparatus 200 is notified of whether to perform the solution.

In step S1814, the information processing apparatus 200 accumulates the teacher data on the teacher data memory region 230. If the solution is to be performed, the current process of the disk is recorded (on a per file basis or on a per database basis), request, the number of solutions indicated is added, and an effect verified state is set. Even when the solution is not performed, the past analysis of the effect (solution) is stored on the teacher data memory region 230.

In step S1816, machine learning is performed using data on the teacher data memory region 230 having recorded new teacher data thereon. For future case, the effect of each solution is verified, information on the effect is accumulated, and information on the influence of the effect is accumulated.

The analysis process of the log information is described. The log information output from the information processing apparatus 100 is sorted according to features, information on a portion of the process taking more time is extracted and a portion of the process having taken the longest time is set to be a target for the analysis process.

The log information about the target is analyzed according to the features and a solution to be performed is determined. In this case, the solution determination process through machine learning is performed.

For example, a solution responsive to features (a combination of a resource column 1905 and a feature column 1910) may be extracted using a resource-based solution table 1900 and a further solution may be learned using the learning module 240. A further solution may be indicated using the artificial intelligence model module 235 having undergone learning.

FIG. 19 illustrates a data structure of the resource-based solution table 1900. The resource-based solution table 1900 includes a resource column 1905, feature column 1910, solution column 1915 and further solution column 1920. The resource column 1905 stores information on a resource. The feature column 1910 stores a feature. The feature column 1910 indicates a feature that may be a threshold. The solution column 1915 stores a solution. The further solution column 1920 stores a further solution.

Memory information at the resource column 1905 indicates that two methods are available. If the feature is "sharp increase," the solution is "expand memory" and the further solution is "indicate size of expansion." If the feature is "continuation near limit," the solution is "expand memory" and the further solution is "indicate size of expansion."

CPU information at the resource column 1905 indicates that two methods are available. If the feature is "continued use at high utilization rate," the solution is "increase the numbers of CPUs and cores" and the further solution is "increase the numbers of CPUs and cores wherever desired." If the feature is "limited high utilization rate," the solution is "distribute process," and the further solution is "indicate which process to be reviewed."

DB information at the resource column 1905 indicates that four methods are available. If the feature is "SQL condition column," the solution is "reinforce index," and the further solution is "indicate up to what combination to be reinforced." If the feature is "memory utilization," the solution is "expand buffer," and the further solution is "indicate size of expansion." If the feature is "file IO speed," the solution is "expand disk," and the further solution is "indicate desired speed level." If the feature is "file IO competition," the solution is "store on separate disks," and the further solution is "indicate files that are to be stored on separate disks."

Internal processing at the resource column 1905 indicates that two methods are available. If the feature is "specific process being slow," the solution is "report to developer." If the feature is "out of memory," the solution is "increase memory size of VM," and the further solution is "indicate size of expansion."

Second Exemplary Embodiment

Figure 20:
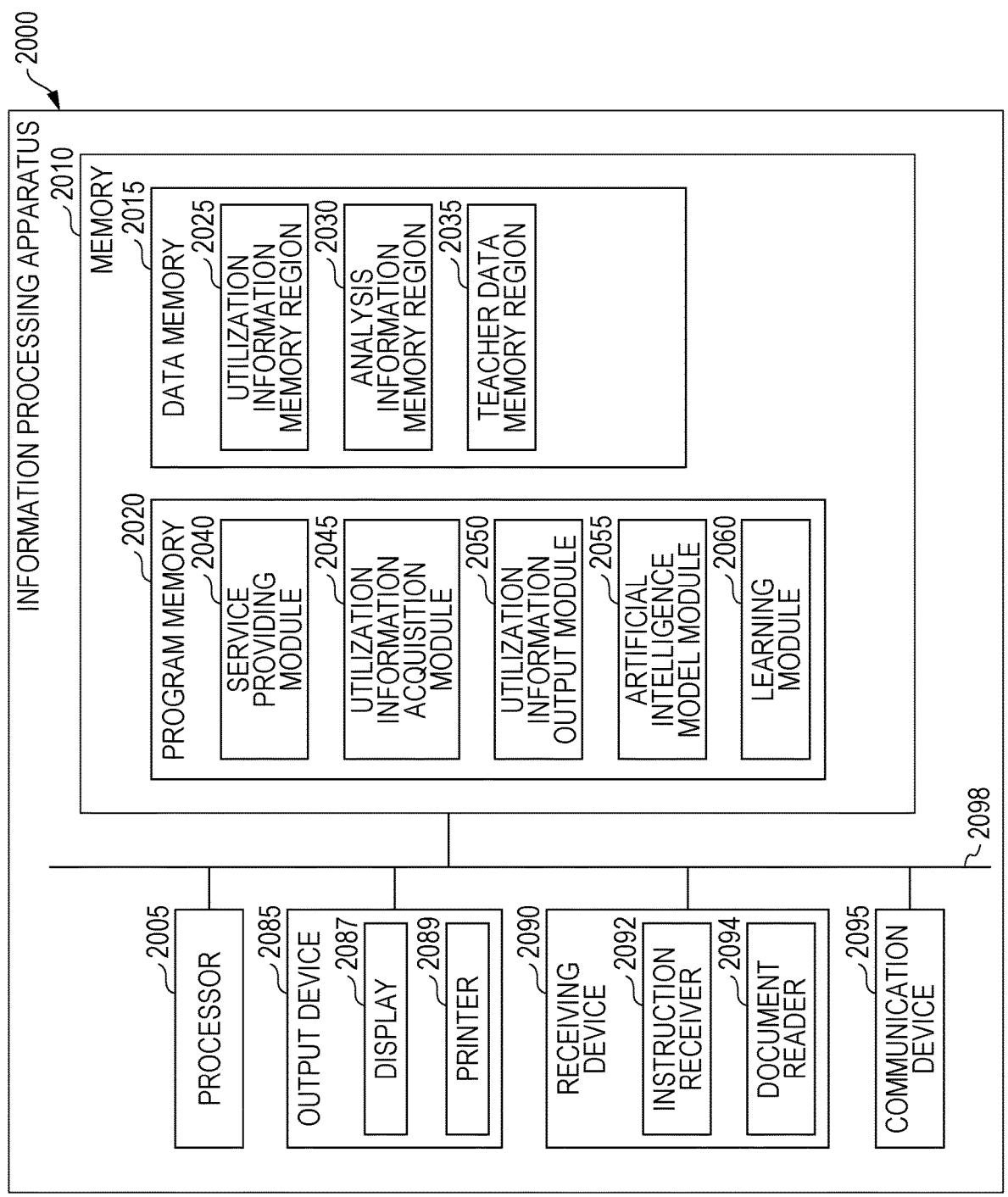
FIG. 20 illustrates a conceptual modular configuration of a second exemplary embodiment.

FIG. 20 illustrates a conceptual modular configuration of a second exemplary embodiment of the disclosure.

An information processing apparatus 2000 in FIG. 20 is a unitary apparatus into which the information processing apparatus 100 and the information processing apparatus 200 are integrated. Specifically, the information processing apparatus 2000 stores the information on the utilization of the resource of the information processing apparatus 2000 and selects a solution. For example, if the information on the utilization of the resource exceeds the threshold when the service providing process is finished, the information processing apparatus 2000 indicates the solution for this event.

The information processing apparatus 2000 of the second exemplary embodiment includes a processor 2005, memory 2010, output device 2085, receiving device 2090, and communication device 2095.

The processor 2005 is connected to the memory 2010, output device 2085, receiving device 2090, and communication device 2095 via a bus 2098.

The memory 2010 includes a data memory 2015 and program memory 2020 and is connected to the processor 2005, output device 2085, receiving device 2090, and communication device 2095 via the bus 2098.

The data memory 2015 includes a utilization information memory region 2025, analysis information memory region 2030, and teacher data memory region 2035.

The program memory 2020 stores a service providing module 2040, utilization information acquisition module 2045, utilization information output module 2050, artificial intelligence model module 2055, and learning module 2060.

The output device 2085 includes a display 2087 and printer 2089 and is connected to the processor 2005, memory 2010, receiving device 2090, and communication device 2095 via the bus 2098.

The receiving device 2090 includes an instruction receiver 2092 and document reader 2094 and is connected to the processor 2005, memory 2010, output device 2085, and communication device 2095 via the bus 2098.

The communication device 2095 is connected to the processor 2005, memory 2010, output device 2085, and receiving device 2090 via the bus 2098.

The utilization information memory region 2025 corresponds to the utilization information memory region 125 in the information processing apparatus 100. The analysis information memory region 2030 corresponds to the monitorable region 130 in the information processing apparatus 100 or the utilization information memory region 225 in the information processing apparatus 200. The teacher data memory region 2035 corresponds to the teacher data memory region 230 in the information processing apparatus 200.

The service providing module 2040 corresponds to the service providing module 135 in the information processing apparatus 100. The utilization information acquisition module 2045 corresponds to the utilization information acquisition module 140 in the information processing apparatus 100. The utilization information output module 2050 corresponds to the utilization information output module 145 in the information processing apparatus 100. The artificial intelligence model module 2055 corresponds to the artificial intelligence model module 235 in the information processing apparatus 200. The learning module 2060 corresponds to the learning module 240 in the information processing apparatus 200.

The other elements (the processor 2005, the output device 2085, the receiving device 2090, and the communication device 2095) are identical in configuration to those having the same names in the information processing apparatus 100 or the information processing apparatus 200.

When the service providing module 2040 starts a process, the utilization information acquisition module 2045 acquires the information on the utilization of the resource utilized in the process and causes the utilization information memory region 2025 to store the information.

If the information on the utilization of the resource satisfies the condition, the utilization information output module 2050 outputs the information on the utilization of the resource from the utilization information memory region 2025 to the analysis information memory region 2030. The outputting of the information includes outputting the information from the memory as a file. Specifically, the outputting may be file outputting from a memory, such as a RAM, to a disk.

The artificial intelligence model module 2055 is an artificial intelligence model that has learned through machine learning to select a solution responsive to the information.

The artificial intelligence model module 2055 thus selects the solution responsive to the information on the utilization of the resource output to the analysis information memory region 2030.

Multiple processors 2005 may be employed. One processor 2005 that performs the process of the service providing module 2040 may be different from another processor 2005 that performs the process of the artificial intelligence model module 2055.

The program described above may be provided in a recorded form on a recording medium or via a communication medium. The program described above may be construed as a computer readable non-transitory recording medium storing the program.

The computer readable non-transitory recording medium recording the program refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first information processing apparatus including a first memory and one or more first processors; and
a second information processing apparatus including a second memory and one or more second processors,
wherein in the first information processing apparatus, the one or more first processors are configured to
in response to a start of an operation, acquire information on utilization of a resource utilized in the operation and cause the first memory to store the information, and
with a condition satisfied with the information on the utilization of the resource, output to the second information processing apparatus the information on the utilization of the resource from the first memory,
wherein in the second information processing apparatus, the one or more second processors are configured to
cause the second memory to store the information on the utilization of the resource output from the first information processing apparatus, and
select a solution responsive to the information on the utilization of the resource stored on the second memory via artificial intelligence that has learned through machine learning to select the solution responsive to the information on the utilization of the resource, and
wherein in the first information processing apparatus, the one or more first processors are configured to, if the operation is interrupted, acquire the information on the utilization of the resource utilized in the operation from the start to an interruption of the operation and cause the first memory to store the information on the utilization of the resource.

2. The information processing system according to claim 1, wherein the information on the utilization of the resource comprises at least one piece of information selected from a group of a utilization status of the first memory, a utilization status of the one or more first processors, an input and output (TO) status of disks, an operational status of structured query language (SQL), a memory status of a database, a file IO status of the database, a specific event record of the database, and a communication status,
wherein the artificial intelligence has learned to select the resource serving as a cause, and
wherein the one or more second processors in the second information processing apparatus are configured to select the solution and the resource serving as the cause.

3. The information processing system according to claim 1, wherein the solution comprises at least one operation selected from a group of operations of expanding the first memory, changing disks, re-locating the disks, modifying a configuration of the disks, increasing a number of the first processors, adding or deleting an index of a database, modifying a memory size of the database, and modifying a communication network, and
wherein the one or more second processors in the second information processing apparatus are configured to perform control to display the solution on a display in response to selection of the solution.

4. An information processing system comprising:
a first information processing apparatus including a first memory and one or more first processors; and
a second information processing apparatus including a second memory and one or more second processors,
wherein in the first information processing apparatus, the one or more first processors are configured to
in response to a start of an operation, acquire information on utilization of a resource utilized in the operation and cause the first memory to store the information, and
with a condition satisfied with the information on the utilization of the resource, output to the second information processing apparatus the information on the utilization of the resource from the first memory,
wherein in the second information processing apparatus, the one or more second processors are configured to
cause the second memory to store the information on the utilization of the resource output from the first information processing apparatus, and
select a solution responsive to the information on the utilization of the resource stored on the second memory via artificial intelligence that has learned through machine learning to select the solution responsive to the information on the utilization of the resource, and
wherein in the first information processing apparatus, the one or more first processors are configured to, if the operation has ended with the condition not satisfied with the information on the utilization of the resource, delete the information on the utilization of the resource from the first memory.

5. An information processing system comprising:
a first information processing apparatus including a first memory and one or more first processors; and
a second information processing apparatus including a second memory and one or more second processors,
wherein in the first information processing apparatus, the one or more first processors are configured to
in response to a start of an operation, acquire information on utilization of a resource utilized in the operation and cause the first memory to store the information, and with a condition satisfied with the information on the utilization of the resource, output to the second information processing apparatus the information on the utilization of the resource from the first memory, wherein in the second information processing apparatus, the one or more second processors are configured to cause the second memory to store the information on the utilization of the resource output from the first information processing apparatus, and select a solution responsive to the information on the utilization of the resource stored on the second memory via artificial intelligence that has learned through machine learning to select the solution responsive to the information on the utilization of the resource, and wherein in the first information processing apparatus, the one or more first processors are configured to, if the operation is interrupted before the condition is satisfied, modify the condition.

6. The information processing system according to claim 5, wherein in the first information processing apparatus, the one or more first processors are configured to modify the condition using a statistical value at a timing of a past interruption of the operation.

7. An information processing apparatus comprising a memory and one or more processors configured to, in response to a start of an operation, acquire information on utilization of a resource utilized in the operation and cause the memory to store the information, with a condition satisfied with the information on the utilization of the resource, output the information on the utilization of the resource from the memory, and select a solution responsive to the output information on the utilization of the resource via artificial intelligence that has learned through machine learning to select the solution responsive to the output information on the utilization of the resource, wherein, the one or more processors are configured to, if the operation is interrupted, acquire the information on the utilization of the resource utilized in the operation from the start to an interruption of the operation and cause the memory to store the information on the utilization of the resource.

8. A non-transitory computer readable medium storing a program causing a computer to execute a process for processing information, the process comprising:

in response to a start of an operation, acquiring information on utilization of a resource utilized in the operation and causing a memory to store the information, with a condition satisfied with the information on the utilization of the resource, outputting the information on the utilization of the resource from the memory, and selecting a solution responsive to the output information on the utilization of the resource via artificial intelligence that has learned through machine learning to select the solution responsive to the information on the utilization of the resource, wherein if the operation is interrupted, the information on the utilization of the resource utilized in the operation from the start to an interruption of the operation is acquired and the memory is caused to store the information on the utilization of the resource.

* * * * *